(12) United States Patent
Zong et al.

(10) Patent No.: US 10,834,209 B2
(45) Date of Patent: Nov. 10, 2020

(54) SESSION ESTABLISHMENT METHOD AND APPARATUS

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/427,990

(22) Filed: May 31, 2019

(65) Prior Publication Data

US 2019/0297148 A1    Sep. 26, 2019

Related U.S. Application Data

(63) Continuation of application No. PCT/CN2018/116064, filed on Nov. 17, 2018.

(30) Foreign Application Priority Data

Nov. 17, 2017  (CN) .......................... 2017 1 1148057
Jan. 15, 2018  (CN) .......................... 2018 1 0037192

(51) Int. Cl.
*H04W 4/00*       (2018.01)
*H04L 29/08*      (2006.01)
(Continued)

(52) U.S. Cl.
CPC .......... *H04L 67/146* (2013.01); *H04W 36/00* (2013.01); *H04W 36/0022* (2013.01); *H04W 60/04* (2013.01); *H04W 84/042* (2013.01)

(58) Field of Classification Search
None
See application file for complete search history.

(56) References Cited

U.S. PATENT DOCUMENTS

2017/0303259 A1   10/2017  Lee et al.
2018/0192445 A1   7/2018   Jiang
(Continued)

FOREIGN PATENT DOCUMENTS

| CN | 106060900 A | 10/2016 |
| CN | 106851589 A | 6/2017 |
| WO | 2017197273 A1 | 11/2017 |

OTHER PUBLICATIONS

"3rd Generation Partnership Project; Technical Specification Group Services and System Aspects; System Architecture for the 5G System; Stage 2 (Release 15)," 3GPP TS 23.501, V1.5.0, Nov. 2017, 170 pages.

(Continued)

*Primary Examiner* — Phirin Sam
(74) *Attorney, Agent, or Firm* — Conley Rose, P.C.

(57) ABSTRACT

A session establishment method and an apparatus, such that an established packet data network (PDN) connection is transferred to a network slice in a fifth generation (5G) network during inter-system mobility of a terminal. The method includes receiving, by a terminal from a control plane function entity, corresponding network slice information used for transferring an established PDN connection to a 5G network, where the corresponding network slice information includes corresponding single network slice selection assistance information (S-NSSAI). The method further includes sending a packet data unit (PDU) session establishment request, where the PDU session establishment request includes corresponding S-NSSAI used for transferring a first PDN connection to the 5G network and a corresponding data network name (DNN) used for transferring the first PDN connection to the 5G network, and the first PDN connection is any one of one or more established PDN connections.

24 Claims, 5 Drawing Sheets

(51) Int. Cl.
  *H04W 60/04* (2009.01)
  *H04W 36/00* (2009.01)
  *H04W 84/04* (2009.01)

(56) References Cited

U.S. PATENT DOCUMENTS

| | | | |
|---|---|---|---|
| 2019/0029065 A1* | 1/2019 | Park | H04W 60/00 |
| 2019/0044980 A1* | 2/2019 | Russell | H04L 65/4061 |
| 2019/0124561 A1* | 4/2019 | Faccin | H04W 76/16 |
| 2019/0124572 A1* | 4/2019 | Park | H04W 72/0446 |
| 2019/0223093 A1* | 7/2019 | Watfa | H04W 36/24 |
| 2019/0350035 A1* | 11/2019 | Kim | H04W 48/02 |
| 2019/0364541 A1* | 11/2019 | Ryu | H04W 76/28 |
| 2020/0178196 A1* | 6/2020 | Wang | H04W 76/16 |

OTHER PUBLICATIONS

ZTE, "Selection RAN Part Network Slice during UE mobility," R3-170065, 3GPP TSG RAN WG3 NR-adhoc, Spokane, USA, Jan. 17-19, 2017, 7 pages.

Qualcomm Inc, "OI#4b—TS 23.501: Interworking between slicing in 5GC and EPC.," S2-177080, SA WG2 Meeting #S2-123, Ljubljana, Slovenia, Oct. 23-27, 2017, 5 pages.

Nokia, "PCO based User Authentication and authorization for Slice access," S3-161903, 3GPP TSG SA WG3 (Security) Meeting #85, Santa Cruz de Tenerife (Spain), Nov. 7-11, 2016, 3 pages.

Foreign Communication From a Counterpart Application, European Application No. 18878075.3, Extended European Search Report dated Dec. 5, 2019, 11 pages.

"3rd Generation Partnership Project; Technical Specification Group Services and System Aspects; System Architecture for the 5G System; Stage 2 (Release 15)," 3GPP TS 23.501, V1.4.0, Sep. 2017, 151 pages.

"3rd Generation Partnership Project; Technical Specification Group Services and System Aspects; Procedures for the 5G System; Stage 2 (Release 15)," 3GPP TS 23.502, V1.2.0, Sep. 2017, 165 pages.

Huawei, et al., "What is RAN part of a network slice?," R2-1710222, 3GPP TSG-RAN WG2#99bis, Prague, Czech Republic, Oct. 9-13, 2017, 4 pages.

Huawei, "Clarification on Allowed NSSAI," R3-173898, 3GPP TSG-RAN WG3 #97bis Meeting, Prague, Czech, Oct. 9-13, 2017, 5 pages.

Ericsson "Mobility procedures for Slicing," R3-173933, 3GPP TSG-RAN WG3 Meeting #97bis, Prague, Czech Republic, Oct. 9-13, 2017, 5 pages.

Huawei, et al., "OI#4b: TS 23.501: Network slicing interworking with eDécor," S2-177318, SA WG2 Meeting #123, Ljubljana, Slovenia, Oct. 23-27, 2017, 5 pages.

Huawei, et al., "OI#4b: TS 23.501: Network slicing interworking with eDécor," S2-177319, SA WG2 Meeting #123, Ljubljana, Slovenia, Oct. 23-27, 2017, 17 pages.

Foreign Communication From a Counterpart Application, PCT Application No. PCT/CN2018/116064, English Translation of International Search Report dated Feb. 19, 2019, 2 pages.

Machine Translation and Abstract of Chinese Publication No. CN106060900, Oct. 26, 2016, 20 pages.

Huawei, et al.,"OI#2 TS 23.501: Updates Network Slicing and NSSF description," S2-177371, SA WG2 Meeting #123, Ljubljana, Slovenia, Oct. 23-27, 2017, 8 pages.

Foreign Communication From a Counterpart Application, Chinese Application No. 201910330663.2, Chinese Office Action dated Oct. 23, 2019, 9 pages.

* cited by examiner

SESSION ESTABLISHMENT METHOD AND APPARATUS

CROSS-REFERENCE TO RELATED APPLICATIONS

This application is a continuation of International Patent Application No. PCT/CN2018/116064, filed on Nov. 17, 2018, which claims priority to Chinese Patent Application No. 201711148057.6, filed on Nov. 17, 2017 and Chinese Patent Application No. 201810037192.1, filed on Jan. 15, 2018. All of the aforementioned patent applications are hereby incorporated by reference in their entireties.

TECHNICAL FIELD

This application relates to the field of communications technologies, and in particular, to a session establishment method and an apparatus.

BACKGROUND

With fast development of wireless communications technologies, a fifth generation (5G) mobile communications technology emerges. At an initial stage of network deployment, because 5G network coverage is insufficient, when a location of user equipment (UE) changes, the UE may be handed over between a 5G network and a fourth generation (4G) network.

A network slice is a logically isolated network used for supporting a specific network capability and network feature, and may include an entire network in an end-to-end (E2E) manner, or some network functions may be shared by a plurality of network slices. Network slicing is a key technology for meeting differentiated requirements of a network in the 5G mobile communications technology.

A network slice may be specifically represented by network slice selection assistance information (NSSAI). When a terminal accesses a 5G core network (5GC), the terminal provides requested NSSAI, and the network selects a corresponding network slice for the terminal based on the NSSAI. In addition, the network determines, based on the requested NSSAI of the terminal, NSSAI of a network slice that the terminal is allowed to access, namely, allowed NSSAI.

However, there is no network slice concept in a 4G network. In 4G, each packet data network (PDN) connection corresponds to an access point name (APN). A data network name (DNN) and single NSSAI (S-NSSAI) are required for creating a packet data unit (PDU) session in a network slice. In an existing protocol, although the APN may be equivalent to the DNN, when the terminal is handed over from the 4G network to the 5GC that supports network slicing, currently there is no related solution for determining S-NSSAI of a network slice corresponding to a PDN connection established by the terminal in the 4G network, in order to establish a PDU session in the network slice of the 5GC based on the determined S-NSSAI.

SUMMARY

Embodiments of this application provide a session establishment method and an apparatus, such that an established PDN connection can be transferred to a network slice in a 5G network during inter-system mobility of a terminal.

To achieve the foregoing objective, the embodiments of this application provide the following technical solutions.

According to a first aspect, a session establishment method is provided. The method includes receiving, by a terminal from a control plane function entity, corresponding network slice information used for transferring an established packet data network (PDN) connection to a 5G network, where the corresponding network slice information used for transferring the established PDN connection to the 5G network includes corresponding network-slice single network slice selection assistance information (S-NSSAI) used for transferring the established PDN connection to the 5G network. The method further includes sending a packet data unit (PDU) session establishment request, where the PDU session establishment request includes corresponding network-slice S-NSSAI used for transferring a first PDN connection to the 5G network, and a corresponding data network name (DNN) used for transferring the first PDN connection to the 5G network, and the first PDN connection is any one of one or more established PDN connections. The terminal establishes one or more PDN connections in a 4G network using one or more control plane function entities.

When the terminal is in a non-roaming scenario or a local breakout (LBO) roaming scenario, the corresponding network-slice S-NSSAI used for transferring the first PDN connection to the 5G network is the network-slice S-NSSAI received by the terminal from the control plane function entity.

When the terminal is in a Home routed scenario, the corresponding network-slice S-NSSAI used for transferring the first PDN connection to the 5G network is a visited public land mobile network (PLMN) network-slice S-NSSAI. In some implementations, before the sending a PDU session establishment request, the method further includes mapping, to the visited PLMN network-slice S-NSSAI by the terminal based on a mapping relationship between home PLMN network-slice S-NSSAI and visited PLMN network-slice S-NSSAI, corresponding network slice information that is received from the control plane function entity and that is used for transferring the first PDN connection to the 5G network.

The control plane function entity sends, to the terminal, the corresponding network slice information used for transferring the established PDN connection to the 5G network, such that when transferring the established PDN connection to the 5G network, the terminal may establish a PDU session in a 5G network slice based on the corresponding network slice information.

In a possible implementation, the corresponding network slice information used for transferring the established PDN connection to the 5G network is carried in a protocol configuration option (PCO) message. The control plane function entity sends, to the terminal using the PCO message, the corresponding network slice information used for transferring the established PDN connection to the 5G network. Further, the PCO message may be sent to the terminal via a mobility management entity (MME) and a base station in the 4G network. The corresponding network slice information used for transferring the established PDN connection to the 5G network is sent using the PCO message, such that the MME may only transparently transmit the message, but does not need to store the message.

In a possible implementation, the terminal further receives indication information from the control plane function entity, where the indication information is used to indicate that the network slice information received from the control plane function entity is home PLMN network slice information. Before sending the PDU session establishment request to a network, the terminal first maps, based on the correspondence between home PLMN network-slice S-NSSAI and visited PLMN network-slice S-NSSAI, corresponding home PLMN network-slice S-NSSAI used for transferring, to 5G, a PDN connection that the terminal wants to transfer, to corresponding visited PLMN network-slice S-NSSAI used for transferring, to 5G, the PDN connection that the terminal wants to transfer. The terminal then adds, to the PDU session establishment request, the corresponding visited PLMN network-slice S-NSSAI used for transferring, to 5G, the PDN connection that the terminal wants to transfer, in order to trigger the network to establish a PDU session.

In a possible implementation, the corresponding network slice information used for transferring the established PDN connection to the 5G network further includes a corresponding network slice instance identifier (NSI-ID) used for transferring the established PDN connection to the 5G network. When more than one network slice instance is deployed for one piece of S-NSSAI in the network, the corresponding network slice information that is sent by the control plane function entity to the terminal and that is used for transferring the PDN connection to the 5G network further includes a corresponding network slice instance identifier, thereby ensuring session continuity after the PDN connection is transferred.

In a possible implementation, before receiving, by a terminal from a control plane function entity, corresponding network slice information used for transferring an established PDN connection to a 5G network, the method further includes sending, by the terminal, a capability indication to the control plane function entity, where the capability indication is used to indicate that the terminal can be transferred to the 5G network. In an implementation, after PDN connections are established in the 4G network, not all terminals need to receive corresponding network slice information used for transferring the established PDN connections to the 5G network. For example, a terminal not supporting a 5G network communication capability cannot be transferred to the 5G network using the information even if the terminal receives the information.

Optionally, sometimes, not all PDN connections can be transferred to the 5G network. For PDN connections that cannot be transferred to the 5G network, session establishment finally fails even if the terminal sends a PDU session establishment request. To avoid an unnecessary signaling waste, before sending a PDU session establishment request, the method further includes determining, by the terminal, a PDN connection that is in the established PDN connections and that can be transferred to the 5G network, where the first PDN connection is any one of the PDN connections that can be transferred to the 5G network. The determining, by the terminal, a PDN connection that is in the established PDN connection and that can be transferred to the 5G network includes sending, by the terminal, a registration request, where the registration request includes corresponding network slice information used for transferring, to the 5G network, a PDN connection that the terminal wants to transfer, and the PDN connection that the terminal wants to transfer is some or all of the established PDN connections; receiving a registration response, where the registration response includes S-NSSAI of a network slice that the terminal is allowed to access; and determining the PDN connection that can be transferred to the 5G network, based on corresponding S-NSSAI used for transferring, to the 5G network, the PDN connection that the terminal wants to transfer and the S-NSSAI of the network slice that the terminal is allowed to access.

It should be noted that, when the terminal is in a non-roaming scenario or a local breakout (LBO) roaming scenario, the corresponding network slice information used for transferring, to the 5G network, the PDN connection that the terminal wants to transfer is the network slice information received by the terminal from the control plane function entity.

When the terminal is in a Home routed scenario, the corresponding network slice information used for transferring, to the 5G network, the PDN connection that the terminal wants to transfer is visited PLMN network slice information. In some implementations, before sending the PDU session establishment request, the method further includes mapping, by the terminal based on the mapping relationship between home PLMN network-slice S-NSSAI and visited PLMN network-slice S-NSSAI, the network slice information sent by the control plane function entity to the visited PLMN network slice information.

According to a second aspect, a session establishment method is provided. The method includes sending, by a control plane function entity to a terminal using an MME, corresponding network slice information used for transferring an established PDN connection to a 5G network, where the corresponding network slice information used for transferring the established PDN connection to the 5G network includes network-slice S-NSSAI corresponding to the established PDN connection. The method further includes receiving a PDU session establishment request that is sent using an AMF by the terminal, where the PDU session establishment request includes network-slice S-NSSAI corresponding to a first PDN connection and a corresponding data network name DNN used for transferring the first PDN connection to the 5G network, and the first PDN connection is any one of the established PDN connections. The control plane function entity sends, to the terminal, the corresponding network slice information used for transferring the established PDN connection to the 5G network, such that when being handed over to the 5G network, the terminal may establish a PDU session in a 5G network slice based on the corresponding network slice information.

In a possible implementation, the corresponding network slice information used for transferring the established PDN connection to the 5G network is carried in a PCO message. The control plane function entity sends, to the terminal using the PCO message, the corresponding network slice information used for transferring the established PDN connection to the 5G network. Further, the PCO message may be sent to the terminal by a mobility management entity (MME) and a base station in a 4G network. The corresponding network slice information used for transferring the established PDN connection to the 5G network is sent using the PCO message, such that the MME may only transparently transmit the message, but does not need to store the message.

In a possible implementation, the control plane function entity may determine, based on an access point name (APN) corresponding to the established PDN connection, the corresponding network slice information used for transferring the established PDN connection to the 5G network.

In a possible implementation, in a Home routed scenario, the control plane function entity further sends indication information to the terminal, where the indication information is used to indicate that the network slice information sent by the control plane function entity is home PLMN network slice information, such that after receiving the indication information, the terminal maps the home PLMN network slice information received from the control plane function entity to visited PLMN network slice information.

In a possible implementation, if the established PDN connection is established in a Home routed scenario, the control plane function entity may determine corresponding home PLMN network slice information used for transferring the established PDN connection to 5G network. The control plane function entity may then map the corresponding home PLMN network slice information used for transferring the established PDN connection to 5G network to visited PLMN network slice information, and send, to the terminal as the corresponding network slice information used for transferring the established PDN connection to 5G network, corresponding visited PLMN network slice information used for transferring the established PDN connection to 5G network. In this way, all network slice information received by the terminal can be directly used, and the terminal does not need to configure a related local mapping table, and no longer needs to determine whether a current situation is the Home Routed scenario when establishing a PDU session.

In a possible implementation, the corresponding network slice information used for transferring the established PDN connection to the 5G network further includes a corresponding network slice instance identifier NSI-ID used for transferring the established PDN connection to the 5G network. When more than one network slice instance is deployed for one piece of S-NSSAI in the network, the corresponding network slice information that is sent by the control plane function entity to the terminal and that is used for transferring the PDN connection to the 5G network further includes a corresponding network slice instance identifier, thereby ensuring session continuity after the PDN connection is transferred.

In a possible implementation, before sending, by a control plane function entity to a terminal, corresponding network slice information used for transferring an established PDN connection to a 5G network, the method includes receiving, by the control plane function entity, a capability indication from the terminal, where the capability indication is used to indicate that the terminal can be handed over to the 5G network. The control plane function entity may simultaneously establish PDN connections for different terminals. However, for PDN connections corresponding to terminals that do not have a 5G network communication capability or do not need to be transferred to the 5G network, the control plane function entity does not need to send, to the terminals, corresponding network slice information used for transferring the PDN connections to the 5G network.

According to a third aspect, a terminal is provided, where the terminal has a function of implementing the method in the first aspect. The function may be implemented by hardware, or may be implemented by hardware executing corresponding software. The hardware or software includes one or more modules corresponding to the foregoing function.

According to a fourth aspect, an apparatus is provided, including a processor and a memory, where the memory is configured to store a computer executable instruction, and when the apparatus runs, the processor executes the computer executable instruction stored in the memory, such that the apparatus performs the session establishment method according to any one of the first aspect or the implementations of the first aspect. The apparatus may be a terminal in the session establishment method according to any one of the first aspect or the implementations of the first aspect, or a chip in the terminal.

According to a fifth aspect, a computer readable storage medium is provided, where the computer readable storage medium stores an instruction, and when the instruction runs on a computer, the computer can perform the session establishment method according to any one of the first aspect or the implementations of the first aspect.

According to a sixth aspect, a computer program product including an instruction is provided, where when the computer program product runs on a computer, the computer can perform the session establishment method according to any one of the first aspect or the implementations of the first aspect.

For a technical effect brought by any design manner in the third aspect to the sixth aspect, refer to technical effects brought by different design manners in the first aspect. Details are not described herein again.

According to a seventh aspect, a control plane function entity is provided, where the control plane function entity has a function of implementing the method in the second aspect. The function may be implemented by hardware, or may be implemented by hardware executing corresponding software. The hardware or software includes one or more modules corresponding to the foregoing function.

According to an eighth aspect, an apparatus is provided, including a processor and a memory, where the memory is configured to store a computer executable instruction, and when the apparatus runs, the processor executes the computer executable instruction stored in the memory, such that the apparatus performs the session establishment method according to any one of the second aspect or the implementations of the second aspect.

According to a ninth aspect, a computer readable storage medium is provided, where the computer readable storage medium stores an instruction, and when the instruction runs on a computer, the computer can perform the session establishment method according to any one of the second aspect or the implementations of the second aspect.

According to a tenth aspect, a computer program product including an instruction is provided, where when the computer program product runs on a computer, the computer can perform the session establishment method according to any one of the second aspect or the implementations of the second aspect.

These aspects or other aspects of this application are clearer and easier to understand in descriptions of the following embodiments.

DESCRIPTION OF EMBODIMENTS

For ease of understanding the technical solutions in the embodiments of this application, the following first briefly describes technologies related to this application.

NSSAI:

The NSSAI includes a plurality of pieces of S-NSSAI. An S-NSSAI includes a slice/service type (SST) and a slice differentiator (SD). The SST and the SD may be defined in a standard or customized by an operator. The SD is an optional information that complements the SST to differentiate amongst multiple Network Slices of the same Slice/Service type, for example, the SD may be used to represent an ownership of a network slice. NSSAI types and functions defined in the 3GPP TS 23.501 standard are shown in Table 1.

TABLE 1

| Type | Function Description |
| --- | --- |
| Configured NSSAI | NSSAI pre-configured on a terminal |
| S-NSSAI | Used to identify a specific network slice |
| Allowed NSSAI | NSSAI, provided for a current registration area by a service network, of a network slice that a terminal is allowed to access |

A network architecture and a service scenario that are described in the embodiments of the present disclosure are intended to describe the technical solutions in the embodiments of the present disclosure more clearly, and constitute no limitation on the technical solutions provided in the embodiments of the present disclosure. A person of ordinary skill in the art may know that, with evolution of the network architecture and emergence of new service scenarios, the technical solutions provided in the embodiments of the present disclosure are also applicable to similar technical problems.

Figure 1:
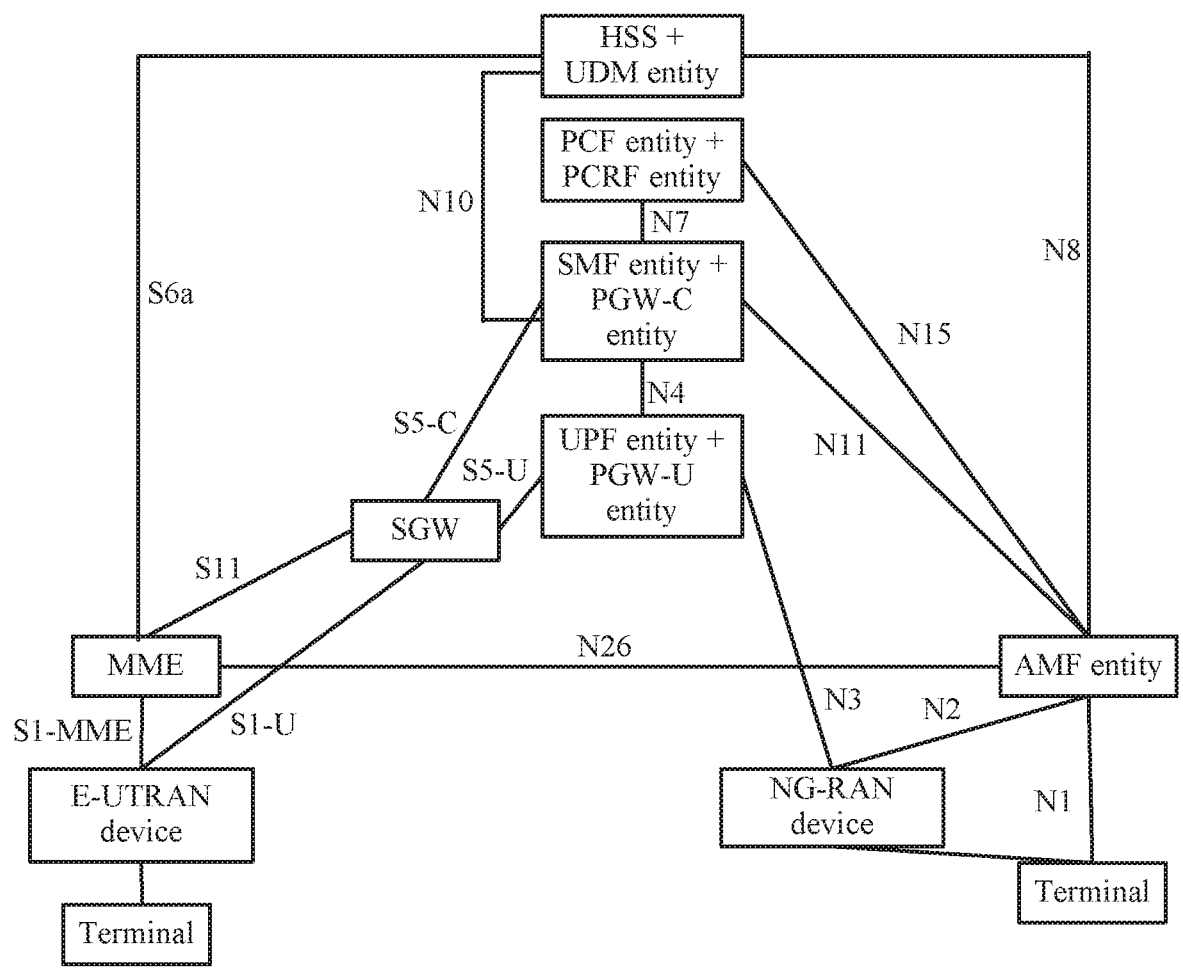
FIG. 1 is a schematic diagram of an architecture for interworking between a 4G network and a 5G network.

An embodiment of the present disclosure provides a mobility management method, which may be applied to an architecture 100 for interworking between a 4G network and a 5G network, as shown in FIG. 1. As shown in FIG. 1, the architecture 100 includes the following entities that are shared by the 4G network and the 5G network: a user plane function (UPF) entity+PDN gateway user plane function (PGW-U) entity, a session management function (session management function, SMF) entity+PDN gateway control plane function (PGW-C) entity, a policy control function (PCF) entity+policy and charging rules function (PCRF) entity, and a home subscriber server (HSS)+unified data management (UDM) entity. The symbol "+" herein represents combination. The UPF is a user plane function of the 5G network. The PGW-U is a gateway user plane function, corresponding to the UPF, of the 4G network. The SMF is a session management function of the 5G network. The PGW-C is a gateway control plane function, corresponding to the SMF, of the 4G network. The PCF is a policy control function of the 5G network. The PCRF is a policy and charging rules function, corresponding to the PCF, of the 4G network. The "combination" herein means that a single device has functions of two entities. In this embodiment of this application, for ease of description, the HSS+UDM entity is referred to as a user data management entity, and the PGW-C entity+SMF entity is referred to as a control plane function entity. A unified description is made herein, and details are not described below again. Certainly, another name may alternatively be used for a network device obtained through the foregoing combination. This embodiment of this application imposes no specific limitation thereon.

In addition, as shown in FIG. 1, the architecture for interworking between the 4G network and the 5G network may further include an MME, a serving gateway (SGW), and an access and mobility management function (AMF) in the 5G network.

A terminal accesses the 4G network using an evolved universal terrestrial radio access network (E-UTRAN) device, and the terminal accesses the 5G network using a next generation radio access network (NG-RAN) device. The E-UTRAN device communicates with the MME through an S1-MME interface. The E-UTRAN device communicates with the SGW through an S1-U interface. The MME communicates with the SGW through an S11 interface. The MME communicates with the user data management entity through an S6a interface. The MME communicates with the AMF entity through an N26 interface. The SGW communicates with the PGW-U entity+UPF entity through an S5-U interface. The SGW communicates with the PGW-C entity+SMF entity through an S5-C interface. The PGW-U entity+UPF entity communicate with the NG-RAN device through an N3 interface. The PGW-U entity+UPF entity communicate with the PGW-C entity+SMF entity through an N4 interface. The PGW-C entity+SMF entity communicate with the PCRF entity+PCF entity through an N7 interface. The HSS+UDM entity communicate with the PGW-C entity+SMF entity through an N10 interface. The HSS+UDM entity communicate with the AMF entity through an N8 interface. The PCRF entity+PCF entity communicate with the AMF entity through an N15 interface. The PGW-C entity+SMF entity communicate with the AMF entity through an N11 interface. The AMF entity communicates with the NG-RAN device through an N2 interface. The AMF entity communicates with the terminal through an N1 interface.

It should be noted that the names of the interfaces between the network elements in FIG. 1 are merely examples, and the interface names may be other names in other implementations. This embodiment of this application imposes no specific limitation thereon.

It should be noted that the NG-RAN device in the 5G network may also be referred to as an access device. The access device is a device that accesses a core network, for example, may be a base station, a broadband network gateway (BNG), an aggregation switch, or a non-3GPP access device. The base station may be a base station in various forms, for example, a macro base station, a micro base station (also referred to as a small cell), a relay station, or an access point. This embodiment of this application imposes no specific limitation thereon.

Certainly, there may further be other network elements in the 4G network and the 5G network. For example, the 4G network may further include a serving general packet radio system (GPRS) support node (SGSN) and the like. Additionally, the 5G network may further include an authentication server function (AUSF) entity, a network slice selection function (NSSF) entity, and the like. This embodiment of this application imposes no specific limitation thereon.

Because a PDN connection in the 4G network is served by the combined PGW-C/SMF (namely, a control plane function entity) and the combined PGW-U/UPF, when the terminal is transferred from the 4G network to the 5G network, a PDU session is still served by the PGW-C/SMF and the PGW-U/UPF. In other words, a session service anchor remains unchanged before and after the transferring, such that an IP address of the session remains unchanged. In this embodiment of this application, when the UE accesses the 4G network and establishes a PDN connection, the control plane function entity sends, to the terminal, corresponding network slice information used for transferring the PDN connection established by the terminal to the 5G network. When the terminal subsequently moves to a 5G coverage area, the terminal adds, to a registration request to be sent to the 5G network, the corresponding network slice information used for transferring the established PDN connection to the 5G network. The 5G network determines, based on the network slice information corresponding to the established PDN connection, an AMF serving the UE and allowed NSSAI, and sends the allowed NSSAI to the terminal. The terminal may determine, based on the allowed NSSAI and the corresponding network slice information used for transferring the PDN connection established by the terminal in the 4G network to the 5G network, those established PDN connections that can be transferred to the 5G network. For a PDN connection that can be transferred to the 5G network, the terminal initiates PDU session establishment, in order to complete session transfer between networks.

The terminal in this embodiment of this application may be various devices having a wireless communication function, for example, a handheld device, an in-vehicle device, a wearable device, a computing device, or another processing device connected to a wireless modem. Alternatively, the terminal may be a subscriber unit, a cellular phone, a smart phone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, or the like. For ease of description, in this application, the aforementioned devices are collectively referred to as terminals.

The following describes the technical solutions in the embodiments of this application with reference to the accompanying drawings in the embodiments of this application. In descriptions of this application. "plurality" means at least two, unless otherwise specified. In addition, to clearly describe the technical solutions in the embodiments of this application, terms, such as "first" and "second", are used in the embodiments of this application to distinguish between same items or similar items that have a basically same function and purpose. A person skilled in the art may understand that the terms, such as "first" and "second", are not intended to limit a quantity and an execution sequence; and the terms, such as "first" and "second", do not indicate a definite difference.

Figure 2:
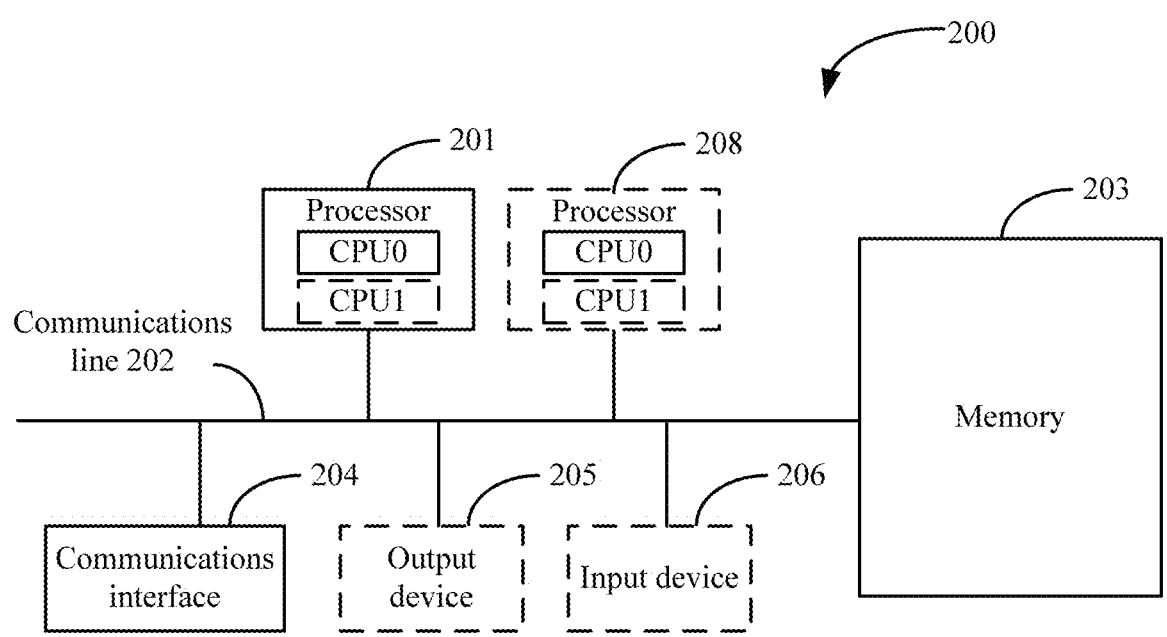
FIG. 2 is a schematic diagram of a hardware structure of a communications device according to an embodiment of this application.

As shown in FIG. 2, the nodes shown in FIG. 1, such as the terminal, the MME, the AMF, the SMF entity+PGW-C entity, the E-UTRAN device, or the NG-RAN device, may be implemented by a communications device (or system) in FIG. 2.

FIG. 2 is a schematic diagram of a hardware structure of a communications device according to an embodiment of this application. The communications device 200 includes at least one processor 201, a communications line 202, a memory 203, and at least one communications interface 204.

The processor 201 may be a general purpose central processing unit (CPU), a microprocessor, an application-specific integrated circuit (ASIC), or one or more integrated circuits configured to control execution of programs of the solutions of this application.

The communications line 202 may include a channel used to transmit information between the foregoing components.

The communications interface 204 is configured to communicate, using any apparatus like a transceiver, with another device or a communications network, such as Ethernet, a radio access network (RAN), or a wireless local area network (WLAN).

The memory 203 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that is accessible to a computer. However, this does not constitute a limitation. The memory may exist independently, and is connected to the processor using the communications line 202. Alternatively, the memory may be integrated with the processor.

The memory 203 is configured to store a computer executable instruction for executing the solutions of this application, and the processor 201 controls execution of the computer executable instruction. The processor 201 is configured to execute the computer executable instruction stored in the memory 203, in order to implement a session establishment method provided in the following embodiment of this application.

Optionally, the computer executable instruction in this embodiment of this application may also be referred to as application program code. This embodiment of this application imposes no specific limitation thereon.

In some implementations according to an embodiment, the processor 201 may include one or more CPUs, such as a CPU 0 and a CPU 1 in FIG. 2.

In some implementations according to an embodiment, the communications device 200 may include a plurality of processors, such as a processor 201 and a processor 208 in FIG. 2. Each of the processors may be a single-core (single-CPU) processor, or may be a multi-core (multi-CPU) processor. The processor herein may be one or more devices, a circuit, and/or a processing core configured to process data (for example, a computer program instruction).

In some implementations according to an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive a user input in a plurality of manners. For example, the input device 206 may be a mouse, a keyboard, a touchscreen device, or a sensor device.

The communications device 200 may be a general purpose device or a dedicated device. In some implementations, the communications device 200 may be a desktop computer, a portable computer, a network server, a personal digital assistant (PDA), a mobile phone, a tablet computer, a wireless terminal device, an embedded device, or a device having a structure similar to that in FIG. 2. A type of the communications device 200 is not limited in this embodiment of this application.

The following describes in detail a session establishment method provided in an embodiment of this application with reference to FIG. 1 and FIG. 2.

Figure 3:
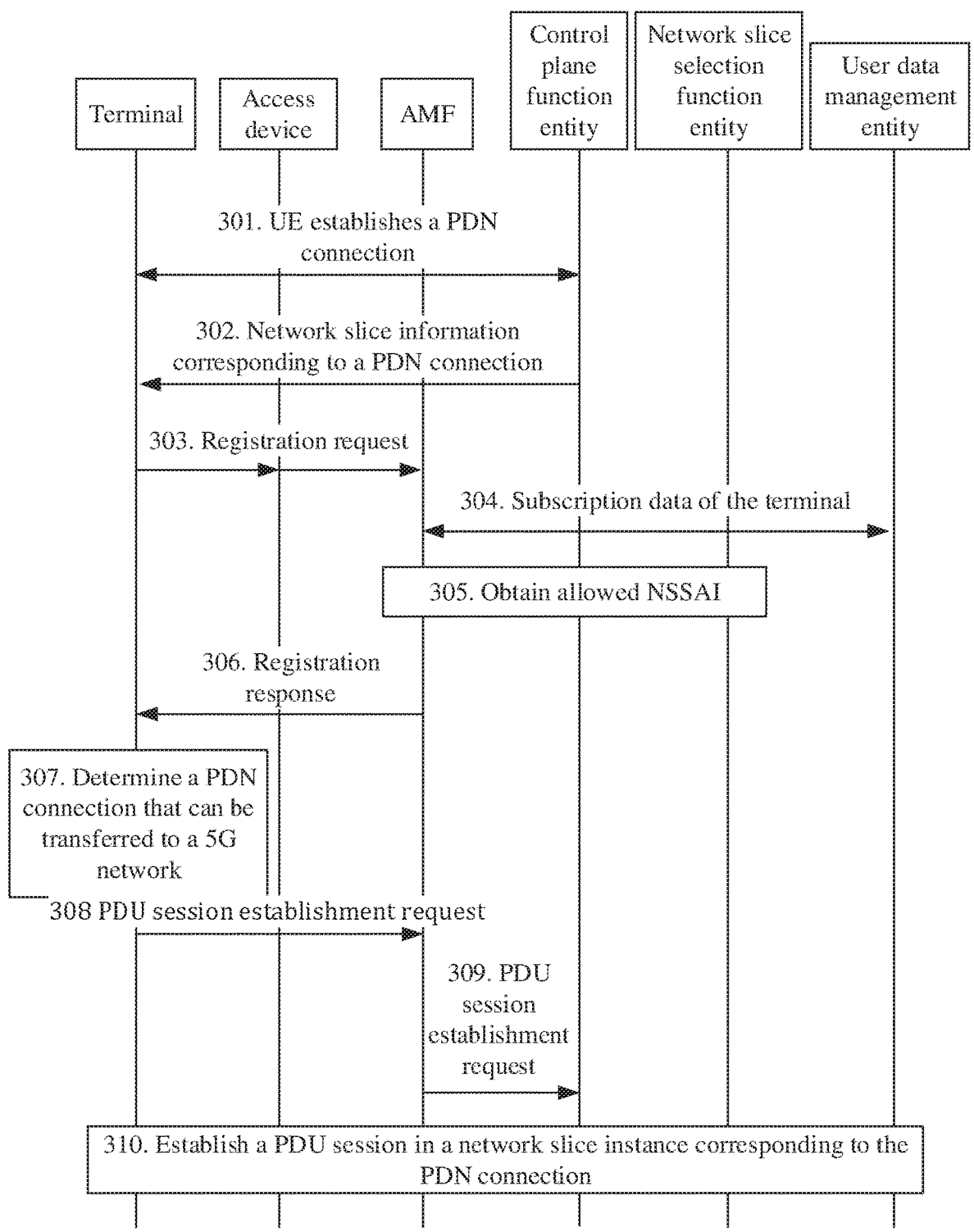
FIG. 3 is a schematic flowchart of a session establishment method according to an embodiment of this application.

FIG. 3 shows a session establishment method provided in an embodiment of this application. In this embodiment, a terminal first accesses a 4G network using an E-UTRAN device, and establishes a PDN connection in the 4G network. Subsequently, because the terminal moves to a 5G service range, the terminal accesses a 5G network using an NG-RAN device. This embodiment of this application is applicable to a non-roaming scenario or an LBO roaming scenario. The method includes the following steps.

Step 301: A terminal establishes a PDN connection in a 4G network.

The PDN connection may be established in an attachment process, or the establishment of the PDN connection may be initiated by the terminal after attachment. For a PDN connection establishment process, refer to an existing protocol. Details are not described herein again.

Optionally, when the terminal establishes a PDN connection, the terminal determines that the terminal may be subsequently transferred to a 5G network, for example, determines that the terminal is capable of supporting the 5G network, the terminal sends a capability indication to a control plane function entity. The capability indication is used to indicate that the terminal can be subsequently transferred to the 5G network. The capability indication may be capability information indicating that the terminal supports 5G (for example, indicating that the terminal supports a 5G NAS). The sending, by the terminal, a capability indication to a control plane function entity includes sending, by the terminal, the capability indication to an MME when the terminal is attached to the 4G network, such that in the PDN connection establishment process, the MME sends the capability indication to the control plane function entity using an SGW. Alternatively, the sending includes sending, by the terminal, a protocol configuration option (PCO) message to the control plane function entity, where the PCO message carries the capability indication.

It should be noted that the terminal may establish one or more PDN connections in the 4G network, and the one or more PDN connections may be served by one or more control plane function entities. This embodiment of this application imposes no limitation thereon. For case of description, an example in which the terminal establishes one or more PDN connections using only one control plane function entity is used in this embodiment of this application.

Step 302: A control plane function entity obtains corresponding network slice information used for transferring the established PDN connection to 5G network, and sends the network slice information to the terminal, such that the terminal receives the corresponding network slice information used for transferring the established PDN connection to 5G network.

The established PDN connection includes one or more PDN connections. In actual deployment, all PDU sessions in 5G network are associated with network slice instances. One network slice instance may be indicated by a network slice instance identifier (NSI-ID). One network slice identified by S-NSSAI may have a plurality of network slice instances (for example, different network slice instances may be used to implement load balancing). In addition, one network slice instance may support one or more data networks. A data network may be identified by a data network name (DNN).

Therefore, based on a network deployment status, to transfer the PDN connection established by the terminal in the 4G network to a PDU session in a network slice instance in the 5G network, the corresponding network slice information that is used for transferring the PDN connection to 5G network and that is sent by the control plane function entity to the terminal may include different content. Because the control plane function entity is located in a network slice instance, when the control plane function entity supports a plurality of network slices, the control plane function entity may obtain S-NSSAI corresponding to different network slice instances supported by the control plane function entity, network slice instance identifiers NSI-IDs, and a name or names of one or more data networks supported by the network slice instances. The corresponding network slice information used for transferring the established PDN connection to 5G network includes corresponding network-slice S-NSSAI used for transferring the established PDN connection to 5G network, and optionally, further includes a corresponding network slice instance identifier NSI-ID used for transferring the established PDN connection to the 5G network. When a DNN used for handing over the terminal to the 5G network is different from an APN in 4G network, optionally, the control plane function entity further needs to obtain the DNN used for transferring the terminal to the 5G network, and send the DNN to the terminal. Details are described below.

In a possible implementation, based on the network deployment status, a correspondence between a PDN connection and S-NSSAI is pre-configured in the control plane function entity. The obtaining, by a control plane function entity, corresponding network slice information used for transferring the established PDN connection to 5G network includes obtaining, by the control plane function entity based on information about the established PDN connection and the pre-configured correspondence between a PDN connection and S-NSSAI, the network-slice S-NSSAI corresponding to the established PDN connection. For this network deployment, the DNN used for transferring the PDN connection to 5G network is the same as the APN in 4G network, and only one network slice instance is deployed for each piece of S-NSSAI.

For example, it is assumed that the pre-configured correspondence between a PDN connection and S-NSSAI is shown in Table 2.

TABLE 2

| PDN Connection Information | S-NSSAI |
|---|---|
| PDN connection 1 | S-NSSAI 1 |
| PDN connection 2 | S-NSSAI 2 |
| PDN connection 3 | S-NSSAI 3 |
| ... | ... |

In another possible implementation, based on the network deployment status, a correspondence between a PDN connection and S-NSSAI/a DNN is pre-configured in the control plane function entity. The obtaining, by a control plane function entity, corresponding network slice information used for transferring the established PDN connection to 5G network includes obtaining, by the control plane function entity based on information about the established PDN connection and the pre-configured correspondence between a PDN connection and S-NSSAI/a DNN, the corresponding network-slice S-NSSAI used for transferring the established PDN connection to the 5G network and the DNN used for transferring the established PDN connection to 5G network. For this network deployment, the DNN used for transferring the PDN connection to 5G network may be different from the APN in 4G network, and only one network slice instance is deployed for each piece of S-NSSAI.

For example, it is assumed that the pre-configured correspondence between a PDN connection and S-NSSAI/a DNN is shown in Table 3.

TABLE 3

| PDN Connection Information | S-NSSAI | DNN |
| --- | --- | --- |
| PDN connection 1 | S-NSSAI 1 | DNN 1 |
| PDN connection 2 | S-NSSAI 2 | DNN 2 |
| ... | ... | ... |

In another possible implementation, based on the network deployment status, a correspondence between a PDN connection and S-NSSAI/a DNN/an NSI-ID is pre-configured in the control plane function entity. The obtaining, by a control plane function entity, corresponding network slice information used for transferring the established PDN connection to 5G network includes obtaining, by the control plane function entity based on information about the established PDN connection and the pre-configured correspondence between a PDN connection and S-NSSAI/a DNN/an NSI-ID, the corresponding network-slice S-NSSAI used for transferring the established PDN connection to 5G network, the DNN used for transferring the established PDN connection to 5G network, and the corresponding network slice instance identifier NSI-ID used for transferring the established PDN connection to 5G network. For this network deployment, the DNN used for transferring the PDN connection to 5G may be different from the APN in 4G network, and more than one network slice instance may be deployed for each piece of S-NSSAI.

For example, it is assumed that the pre-configured correspondence between a PDN connection and S-NSSAI/a DNN/an NSI-ID is shown in Table 4.

TABLE 4

| PDN Connection Information | S-NSSAI | NSI-ID | DNN |
| --- | --- | --- | --- |
| PDN connection 1 | S-NSSAI 1 | NSI-ID 1 | DNN 1 |
| PDN connection 2 | S-NSSAI 2 | NSI-ID 2 | DNN 2 |
| ... | ... | ... | ... |

A PDN connection may be represented by an APN corresponding to the PDN connection. In other words, the information about the established PDN connection may include an APN corresponding to the established PDN connection. Optionally, a PDN connection may be represented by an APN corresponding to the PDN connection and related subscription information. A specific form of PDN connection information is not limited in this embodiment of this application.

In some implementations, in a PDN connection establishment response or in an attachment response for the terminal, the control plane function entity may send, to the terminal using a PCO message, the corresponding network slice information used for transferring the established PDN connection to 5G network. Optionally, the PCO message sent by the control plane function entity to the terminal further includes the DNN used for transferring the established PDN connection to 5G network.

Step 303: When the terminal moves to a coverage area of the 5G network, the terminal initiates a registration request, where the registration request includes corresponding network slice information used for transferring, to 5G network, a PDN connection that the terminal needs to transfer, the registration request is sent to an AMF using an access device (for example, a base station), such that the AMF receives the registration request, and the PDN connection that the terminal needs to transfer is some or all of the established PDN connections.

In some embodiments, after receiving, from the control plane function entity, the corresponding network slice information used for transferring the established PDN connection to 5G in step 302, the terminal determines, according to a policy requirement of the terminal, the PDN connection that the terminal needs to transfer and the corresponding network slice information used for transferring, to 5G network, the PDN connection that the terminal needs to transfer. For example, a user triggers establishment of a PDN connection 1 and a PDN connection 2 respectively using an APP 1 and an APP 2 installed on the terminal. The control plane function entity returns, to the terminal, corresponding network slice information used for transferring the PDN connection 1 to 5G network and corresponding network slice information used for transferring the PDN connection 2 to 5G network. In this case, if the terminal detects that a transfer policy (which may be set by the user, or may be inherent in the APPs) has been set for the APP 1 and the APP 2, for example, the APP 1 is prohibited from being transferred to the 5G network, and the APP 2 is preferentially transferred to 5G network when there is 5G coverage, the terminal determines that the PDN connection 2 is the PDN connection that the terminal needs to transfer, and corresponding network slice information used for transferring the PDN connection 2 to 5G network is the corresponding network slice information used for transferring, to 5G network, the PDN connection that the terminal needs to transfer.

Further, when the terminal initiates the registration request to the 5G network, if the registration request carries S-NSSAI, the access device selects the AMF based on the S-NSSAI that is carried in the registration request. In this embodiment of this application, the terminal adds, to the registration request, the corresponding network-slice S-NSSAI used for transferring, to 5G network, the PDN connection that the terminal needs to transfer. Optionally, the registration request may further carry other S-NSSAI requested by the terminal. The access device selects the AMF based on the corresponding network-slice S-NSSAI used for transferring, to 5G network, the PDN connection that the terminal needs to transfer, and the other S-NSSAI requested by the terminal, and forwards the registration request to the selected AMF, such that the AMF receives the registration request sent by the terminal.

In some embodiments, the terminal may add, to "requested NSSAI", both the corresponding network-slice S-NSSAI used for transferring, to 5G network, the PDN connection that the terminal needs to transfer, and the other S-NSSAI requested by the terminal; and send the "requested NSSAI" to the AMF. In addition, the terminal notifies the AMF of S-NSSAI, in the "requested NSSAI", corresponding to the established PDN connection. Alternatively, the terminal places the other requested S-NSSAI in "requested NSSAI", and places, in other independent NSSAI, the corresponding network-slice S-NSSAI used for transferring, to 5G network, the PDN connection that the terminal needs to transfer, and sends the other independent NSSAI to the AMF. A method for sending, by the terminal using the registration request to the AMF, the corresponding network-slice S-NSSAI used for transferring, to 5G, the PDN connection that the terminal needs to transfer is not limited in this embodiment of this application.

Optionally, the registration request further includes an identifier of the terminal. After receiving the registration request from the terminal, the AMF may perform a process, such as authentication, on the terminal, and finally obtain a permanent identifier (such as a Subscription Permanent Identifier (SUPI)) of the terminal. For details, refer to a related standard protocol. Details are not described again in this embodiment of this application.

Step 304: The AMF obtains subscription data of the terminal, where the subscription data of the terminal includes network slice subscription data of the terminal and a correspondence between an APN corresponding to a PDN connection that the terminal needs to transfer and an identifier of a control plane function entity.

In some embodiments, the AMF obtains the subscription data of the terminal based on the terminal identifier (or SUPI) in the registration request. The AMF preferentially obtains the subscription data of the terminal locally. If there is no local subscription data of the terminal, the AMF obtains the subscription data of the terminal from a user data management entity. Optionally, the AMF further stores the subscription data of the terminal in a context corresponding to the terminal.

The network slice subscription data of the terminal includes S-NSSAI corresponding to a subscribed network slice, and optionally, further includes information, such as a DNN, corresponding to the subscribed network slice.

Step 305: The AMF obtains S-NSSAI (namely, allowed NSSAI) corresponding to a network slice that the terminal is allowed to access.

In some embodiments, the AMF may obtain the allowed NSSAI based on information, such as the corresponding network slice information used for transferring, to 5G network, the PDN connection that the terminal needs to transfer and the subscription data of the terminal.

In a possible implementation, the AMF determines the allowed NSSAI based on information, such as the corresponding network slice information used for transferring, to 5G network, the PDN connection that the terminal needs to transfer and the subscription data of the terminal. Optionally, the AMF may alternatively determine the allowed NSSAI based on the other S-NSSAI requested by the terminal.

For example, when the corresponding network slice information used for transferring, to 5G network, the PDN connection that the terminal needs to transfer includes the corresponding network-slice S-NSSAI used for transferring, to 5G network, the PDN connection that the terminal needs to transfer, the AMF obtains a union of the network-slice S-NSSAI corresponding to the PDN connection that the terminal needs to transfer and the other S-NSSAI requested by the terminal; and then obtains an intersection of the union, the S-NSSAI corresponding to the network slice to which the terminal has subscribed, and S-NSSAI corresponding to a network slice supported by the AMF, to determine the allowed NSSAI. When the corresponding network slice information used for transferring, to 5G network, the PDN connection that the terminal needs to transfer includes the network-slice S-NSSAI corresponding to the PDN connection that the terminal needs to transfer and a corresponding network slice instance identifier NSI-ID used for transferring, to 5G, the PDN connection that the terminal needs to transfer, in addition to the foregoing determining, the AMF further eliminates, based on the network slice instance identifier NSI-ID used for transferring, to 5G network, the PDN connection that the terminal needs to transfer, a PDN connection corresponding to a network slice instance that the AMF cannot serve.

For example, the network-slice S-NSSAI corresponding to the PDN connection that the terminal needs to transfer includes S-NSSAI 1 and S-NSSAI 2; the other S-NSSAI requested by the terminal includes S-NSSAI 3 and S-NSSAI 4; the S-NSSAI corresponding to the network slice to which the terminal has subscribed includes the S-NSSAI 1, the S-NSSAI 3, and S-NSSAI 5; and the S-NSSAI corresponding to the network slice supported by the AMF includes the S-NSSAI 1, S-NSSAI 12, S-NSSAI 13, S-NSSAI 14, and S-NSSAI 15. Then the AMF obtains a union of the network-slice S-NSSAI corresponding to the PDN connection that the terminal needs to transfer and the other S-NSSAI requested by the terminal: the S-NSSAI 1, the S-NSSAI 2, the S-NSSAI 3, and the S-NSSAI 4; and then obtains an intersection of the union, the S-NSSAI corresponding to the network slice to which the terminal has subscribed, and the S-NSSAI corresponding to the network slice supported by the AMF: the S-NSSAI 1 and the S-NSSAI 3, thereby determining that the allowed NSSAI includes the S-NSSAI 1 and the S-NSSAI 3.

In another possible implementation, the AMF requests a network slice selection function (NSSF) entity to determine the allowed NSSAI for the terminal. Additionally, the AMF sends a slice selection request to the NSSF. The slice selection request includes the corresponding network slice information used for transferring, to 5G network, the PDN connection that the terminal needs to transfer and the subscription data of the terminal, and optionally, further includes the other S-NSSAI requested by the terminal. The NSSF determines the allowed NSSAI and a target AMF set corresponding to the allowed NSSAI based on the corresponding network slice information used for transferring, to 5G network, the PDN connection that the terminal needs to transfer and the subscription data of the terminal, and optionally, further based on the other S-NSSAI requested by the terminal. In some embodiments, when the corresponding network slice information used for transferring, to 5G network, the PDN connection that the terminal needs to transfer includes the corresponding network-slice S-NSSAI used for transferring, to 5G network, the PDN connection that the terminal needs to transfer, the NSSF obtains a union of the corresponding network-slice S-NSSAI used for transferring, to 5G network, the PDN connection that the terminal needs to transfer and the other S-NSSAI requested by the terminal; then obtains an intersection of the union and the S-NSSAI corresponding to the network slice to which the terminal has subscribed; and then determines, based on information such as a location of the terminal and an AMF deployment status in a network, the allowed NSSAI and the target AMF set corresponding to the allowed NSSAI. The allowed NSSAI is some or all of first NSSAI. Any AMF in the target AMF set can serve any network slice corresponding to the allowed NSSAI. Optionally, the NSSF may select a target AMF from the target AMF set.

The NSSF sends the allowed NSSAI and the target AMF set (or the target AMF selected from the target AMF set) to the AMF. In this embodiment of this application, the AMF and the NSSF may alternatively determine the allowed NSSAI using another method. A method for determining the allowed NSSAI by the AMF and the NSSF is not limited in this embodiment of this application.

The AMF determines, based on the target AMF set or target AMF returned by the NSSF, whether the terminal needs to be redirected to another AMF for processing. If the terminal needs to be redirected to another AMF, the AMF redirects the terminal to the other AMF. A redirection method is well known to the public. Details are not described again in this embodiment of this application. In this embodiment of this application, it is considered by default that the AMF is included in the target AMF set, that is, the AMF does not need to redirect the terminal to another AMF for processing.

Step 306: The AMF sends a registration response to the terminal, such that the terminal receives the registration response, where the registration response includes the S-NSSAI corresponding to the network slice that the terminal is allowed to access, namely, the allowed NSSAI.

Step 307: The terminal determines a PDN connection that can be transferred to the 5G network.

In some embodiments, the terminal determines the PDN connection that can be transferred to the 5G network, based on the S-NSSAI corresponding to the network slice that the terminal is allowed to access and the corresponding network slice information used for transferring, to 5G, the PDN connection that the terminal needs to transfer. For example, the S-NSSAI corresponding to the network slice that the terminal is allowed to access includes S-NSSAI 1 and S-NSSAI 3, and the network-slice S-NSSAI corresponding to the PDN connection that the terminal needs to transfer includes the S-NSSAI 1 and S-NSSAI 2. Then the terminal determines that a PDN connection corresponding to a network slice whose S-NSSAI is the S-NSSAI 1 can be transferred to the 5G network.

The following steps are performed for each PDN connection that can be transferred to the 5G network, to transfer the PDN connection to a PDU session in the 5G network.

Step 308: The terminal sends a PDU session establishment request to the AMF, such that the AMF receives the PDU session establishment request sent by the terminal, where the PDU session establishment request includes network-slice S-NSSAI corresponding to a first PDN connection, and a DNN used for transferring the first PDN connection to 5G, and the first PDN connection is any one of the PDN connection that can be transferred.

In some embodiments, if the control plane function entity does not send, to the terminal, the DNN used for transferring the established PDN connection to 5G in step 302, the terminal considers by default that the DNN used for transferring the established PDN connection to 5G is the same as the APN in 4G. Therefore, the DNN used for transferring the first PDN connection to 5G is the same as an APN corresponding to the first PDN connection.

If the control plane function entity sends, to the terminal, the DNN used for transferring the established PDN connection to 5G in step 302, the terminal considers by default that the DNN used for transferring the established PDN connection to 5G is different from the APN in 4G. Therefore, the PDU session establishment request further includes the APN corresponding to the first PDN connection.

It should be noted that, after a PDN connection is established, the terminal stores an APN corresponding to the established PDN connection.

Step 309: The AMF determines the control plane function entity, and forwards the PDU session establishment request to the determined control plane function entity, such that the control plane function entity receives the PDU session establishment request.

The AMF determines the control plane function entity based on the APN corresponding to the first PDN connection and a correspondence between an APN and an identifier of a control plane function entity.

In some embodiments, when the PDU session establishment request received by the AMF includes the network-slice S-NSSAI corresponding to the first PDN connection and the DNN used for transferring the first PDN connection to 5G, the AMF determines that the APN corresponding to the first PDN connection is the same as the DNN used for transferring the first PDN connection to 5G, and determines the control plane function entity based on the APN corresponding to the first PDN connection and the correspondence between an APN and an identifier of a control plane function entity. When the PDU session establishment request received by the AMF includes the network-slice S-NSSAI corresponding to the first PDN connection, the DNN used for transferring the first PDN connection to 5G. and the APN corresponding to the first PDN connection, the AMF determines the control plane function entity based on the APN corresponding to the first PDN connection and the correspondence between an APN and an identifier of a control plane function entity.

Step 310: Establish a PDU session in a network slice instance corresponding to the PDN connection.

A subsequent process of PDU session establishment is the same as that in an existing protocol. Details are not described herein.

In this embodiment of this application, when the UE has established a PDN connection in the 4G network, the control plane function entity determines corresponding network slice information used for transferring the established PDN connection to 5G, and sends the network slice information to the UE via PCO. When the UE is subsequently registered to a 5GC, the UE adds the network slice information to a request. This helps the 5GC select a corresponding 5G network slice supporting the established PDN connection, and ensures that an IP address of a session remains unchanged.

Figure 4:
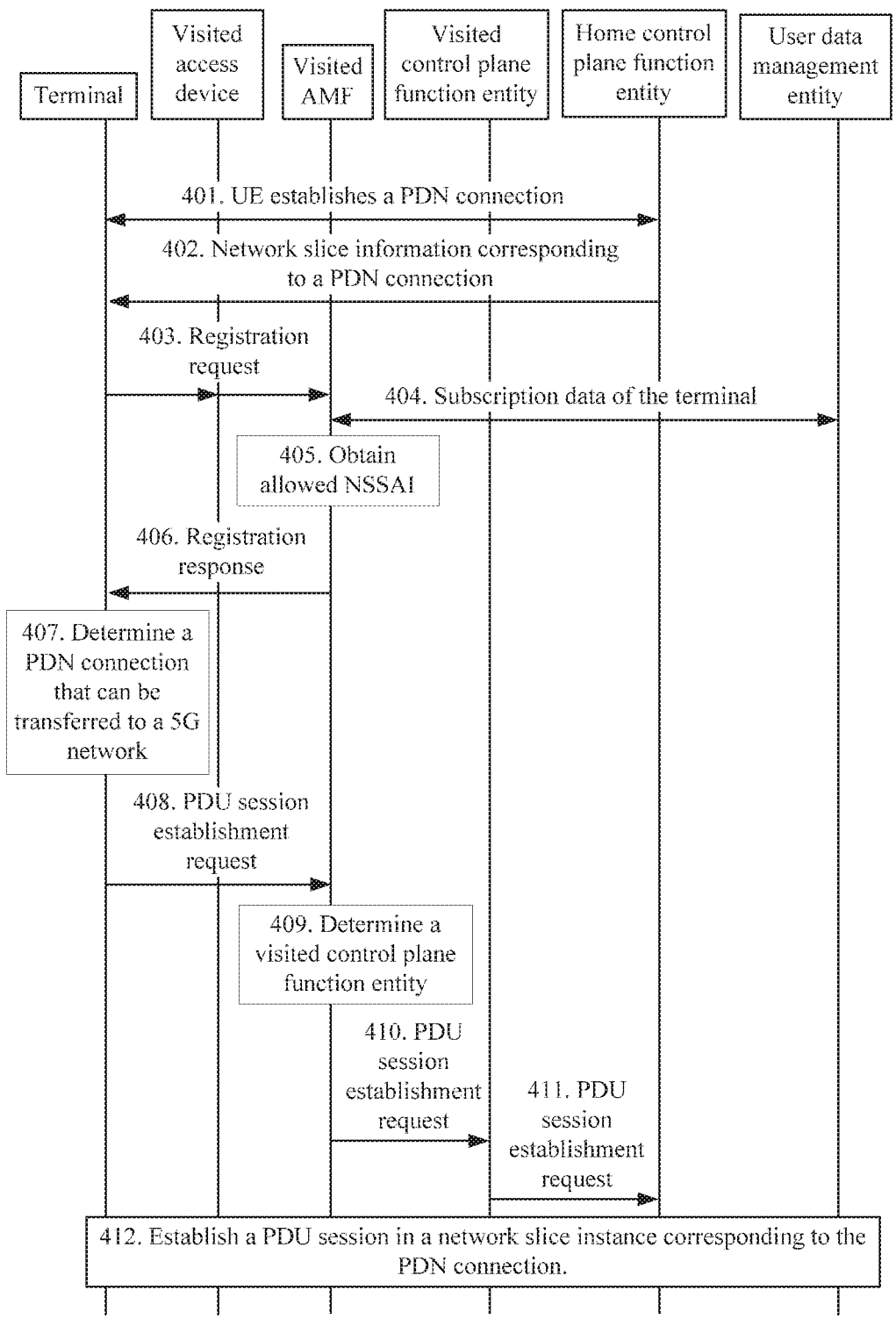
FIG. 4 is another schematic flowchart of a session establishment method according to an embodiment of this application.

FIG. 4 shows another session establishment method provided in an embodiment of this application. In this embodiment, a terminal first accesses a 4G network using an E-UTRAN device, and establishes a PDN connection in the 4G network. Subsequently, because the terminal moves to a 5G service range, the terminal accesses a 5G network using an NG-RAN device. This embodiment of this application is applicable to a home public land mobile operator network (HPLMN) routed (home routed) roaming scenario. In this embodiment of this application, a home control plane function entity is located in the HPLMN. The method includes the following steps.

Step 401: A terminal establishes a PDN connection in a 4G network.

Step 402: A home control plane function entity obtains corresponding network slice information used for transferring the established PDN connection to 5G network, and sends the network slice information to the terminal, such that the terminal receives the corresponding network slice information used for transferring the established PDN connection to 5G network.

Step 401 is the same as step 301, and step 402 is the same as step 302. For related descriptions, refer to the related steps in the foregoing embodiment. Details are not described herein again. It should be noted that, in an implementation, the corresponding network slice information that is sent by the home control plane function entity to the terminal and that is used for transferring the PDN connection to 5G is home PLMN network slice information (for example, S-NSSAI). If the network slice information sent by the home control plane function entity to the UE is the home PLMN network slice information, the home control plane function entity sends, to the UE, indication information indicating that the PDN connection is home-routed. The indication information is used to indicate that the network slice information received from the home control plane function entity is the home PLMN network slice information, such that the UE maps home PLMN S-NSSAI to visited PLMN S-NSSAI based on a home PLMN ID, the home PLMN S-NSSAI, and a mapping relationship that is configured by the UE and that is between home PLMN S-NSSAI and visited PLMN S-NSSAI. The home-routed indication information may be the home PLMN ID or a home-routed tag.

In another implementation, the corresponding network slice information that is sent by the home control plane function entity to the terminal and that is used for transferring the PDN connection to 5G is visited PLMN S-NSSAI. In this case, the home control plane function entity maps corresponding home PLMN network slice information used for transferring the PDN connection to 5G to visited PLMN network slice information. In some embodiments, the home control plane function entity first determines, according to the method of step 302, the corresponding home PLMN network slice information used for transferring the PDN connection to 5G, and then maps the corresponding home PLMN network slice information used for transferring the PDN connection to 5G to the visited PLMN network slice information. The home control plane function entity obtains, from an MME, a PLMN ID of the visited PLMN that is currently accessed by the terminal, and then maps the home PLMN network slice information to the visited PLMN network slice information based on a mapping relationship that is configured by the home control plane function entity and that is between visited PLMN S-NSSAI and home PLMN S-NSSAI, as shown in the following table P,

TABLE 5

| Home PLMN ID | Home PLMN S-NSSAI | Visited PLMN ID | Visited PLMN S-NSSAI |
|---|---|---|---|
| PLMN ID 1 | S-NSSAI 1 | PLMN ID 2 | S-NSSAI 12 |
| PLMN ID 1 | S-NSSAI 2 | PLMN ID 2 | S-NSSAI 22 |
| PLMN ID 1 | S-NSSAI 1 | PLMN ID 3 | S-NSSAI 13 |

Optionally, the home control plane function entity may alternatively request an NSSF to map the home PLMN S-NSSAI to the visited PLMN S-NSSAI. In some embodiments, the control plane function entity sends, to the NSSF, the home PLMN ID, the home PLMN S-NSSAI, and the visited PLMN ID. The NSSF returns the visited PLMN S-NSSAI to the control plane function entity.

Step 403: When the terminal moves to a coverage area of the 5G network, the terminal initiates a registration request, where the registration request includes corresponding network slice information used for transferring, to 5G, a PDN connection that the terminal wants to transfer, and the registration request is sent to an AMF using an access device (for example, a base station), such that the AMF receives the registration request. If the terminal receives the home-routed indication information in step 402, the terminal maps the received home PLMN network slice information to visited PLMN network slice information. The terminal maps the home PLMN network slice information to the visited PLMN network slice information based on the home PLMN network slice information, a home PLMN ID, and a mapping relationship that is configured by the UE and that is between home PLMN network slice information and visited PLMN network slice information. The PDN connection that the terminal wants to transfer is some or all of the established PDN connection.

Step 404: The AMF obtains subscription data of the terminal, where the subscription data of the terminal includes network slice subscription data of the terminal and a correspondence between an APN corresponding to a PDN connection that the terminal wants to transfer and an identifier of a control plane function entity.

Step 404 is the same as step 304. For related descriptions, refer to the related step in the foregoing embodiment. Details are not described herein again.

Step 405: The AMF obtains S-NSSAI (namely, allowed NSSAI) corresponding to a network slice that the terminal is allowed to access.

In a possible implementation, an implementation of step 403 is the same as that of step 303 except that the AMF in step 403 is a visited AMF but the AMF in step 303 is a home AMF. In this case, in step 405, based on a correspondence between home PLMN network-slice S-NSSAI and visited PLMN network-slice S-NSSAI, the AMF maps the corresponding network-slice S-NSSAI used for transferring the established PDN connection to 5G to visited PLMN network-slice S-NSSAI, and maps S-NSSAI of a network slice to which a user has subscribed to the visited PLMN network-slice S-NSSAI. The AMF then determines S-NSSAI corresponding to a visited PLMN network slice that the terminal is allowed to access. A determining method is the same as that of step 305. Details are not described herein again.

In another possible implementation, the corresponding network slice information used for transferring, to 5G, the PDN connection that the terminal wants to transfer in step 403 is obtained by the terminal by mapping, based on the correspondence between home PLMN network-slice S-NSSAI and visited PLMN network-slice S-NSSAI, the corresponding network-slice S-NSSAI used for transferring, to 5G, the PDN connection that the terminal wants to transfer, to the corresponding visited PLMN network-slice S-NSSAI used for transferring, to 5G, the PDN connection that the terminal wants to transfer. To be specific, compared with step 302, after determining the PDN connection that the terminal wants to transfer, the terminal further needs to map, based on the correspondence between home PLMN network-slice S-NSSAI and visited PLMN network-slice S-NSSAI, the corresponding network-slice S-NSSAI used for transferring, to 5G, the PDN connection that the terminal wants to transfer, to the corresponding visited PLMN network-slice S-NSSAI used for transferring, to 5G, the PDN connection that the terminal wants to transfer. Therefore, in step 405, based on the correspondence between home PLMN network-slice S-NSSAI and visited PLMN network-slice S-NSSAI, the AMF also maps the S-NSSAI of the network slice to which the user has subscribed to the visited PLMN network-slice S-NSSAI; and then determines the S-NSSAI corresponding to the visited PLMN network slice that the terminal is allowed to access, based on the visited PLMN network-slice S-NSSAI corresponding to the S-NSSAI of the network slice to which the user has subscribed, and based on the corresponding visited PLMN network-slice S-NSSAI used for transferring, to 5G, the PDN connection that the terminal wants to transfer. A determining method is the same as that of step 305. Details are not described herein again.

Step 406: The AMF sends a registration response to the terminal, such that the terminal receives the registration response, where the registration response includes S-NSSAI corresponding to a visited PLMN network slice that the terminal is allowed to access, namely, allowed NSSAI.

Step 407: The terminal determines a PDN connection that can be transferred to the 5G network.

Referring to step 307, a difference from step 307 lies in: If the corresponding network slice information that is received by the terminal and that is used for transferring the PDN connection to 5G is the home PLMN S-NSSAI, the terminal maps, based on the correspondence between home PLMN network-slice S-NSSAI and visited PLMN network-slice S-NSSAI, the network-slice S-NSSAI corresponding to the PDN connection that the terminal wants to transfer, to the corresponding visited PLMN network-slice S-NSSAI used for transferring, to 5G, the PDN connection that the terminal wants to transfer. The terminal then determines the PDN connection that can be transferred to the 5G network with reference to the S-NSSAI that is received in step 406 and that corresponds to the visited PLMN network slice that the terminal is allowed to access.

The following steps are performed for each PDN connection that can be transferred to the 5G network, to transfer the PDN connection to a PDU session in the 5G network.

Step 408: The terminal sends a PDU session establishment request to the AMF, such that the AMF receives the PDU session establishment request sent by the terminal. The PDU session establishment request includes corresponding visited PLMN network-slice S-NSSAI used for transferring a first PDN connection to the 5G network, and a DNN used for transferring the first PDN connection to 5G. and the first PDN connection is any one of the PDN connection that can be transferred.

In some embodiments, in step 402, if the home control plane function entity does not send, to the terminal, the DNN used for transferring the established PDN connection to 5G, the terminal considers by default that the DNN used for transferring the established PDN connection to 5G is the same as an APN in 4G. Therefore, the DNN used for transferring the first PDN connection to 5G is the same as an APN corresponding to the first PDN connection.

If the home control plane function entity sends, to the terminal, the DNN used for transferring the established PDN connection to 5G in step 402, the terminal considers by default that the DNN used for transferring the established PDN connection to 5G is different from the APN in 4G. Therefore, the PDU session establishment request further includes the APN corresponding to the first PDN connection.

It should be noted that, after a PDN connection is established, the terminal stores an APN corresponding to the established PDN connection.

Optionally, if the UE receives an identifier of a home PLMN network slice instance in step 402, the UE sends information about the identifier of the home PLMN network slice instance to the AMF.

Step 409: The AMF determines a visited control plane function entity and the home control plane function entity, and forwards the PDU session establishment request to the determined visited control plane function entity, such that the visited control plane function entity receives the PDU session establishment request.

In some embodiments, determining, by the AMF, the home control plane function entity includes obtaining, by the AMF, PDN connection context information of the terminal from a user data management entity, where the PDN connection context information includes the correspondence between an APN corresponding to a PDN connection and an identifier of a home control plane function entity. When the PDU session establishment request received by the AMF includes visited PLMN network-slice S-NSSAI corresponding to the first PDN connection and the DNN used for transferring the first PDN connection to 5G, the AMF determines that the APN corresponding to the first PDN connection is the same as the DNN used for transferring the first PDN connection to 5G, and determines the home control plane function entity based on the APN corresponding to the first PDN connection and the correspondence between an APN and an identifier of a home control plane function entity. When the PDU session establishment request received by the AMF includes the visited PLMN network-slice S-NSSAI corresponding to the first PDN connection, the DNN used for transferring the first PDN connection to 5G. and the APN corresponding to the first PDN connection, the AMF determines the home control plane function entity based on the APN corresponding to the first PDN connection and the correspondence between an APN and an identifier of a home control plane function entity.

The determining, by the AMF, a visited control plane function entity includes determining, by the AMF, the visited control plane function entity based on the visited PLMN network-slice S-NSSAI corresponding to the first PDN connection and the DNN used for transferring the first PDN connection to 5G. In some embodiments, the AMF may determine the visited control plane function entity based on a local configuration or by querying a network function repository function (NRF) entity. For a determining process, refer to an existing protocol. Details are not described herein again. If the AMF receives an identifier of a home PLMN network slice instance from the UE in step 408, the AMF selects a visited control plane function entity further based on the identifier of the home PLMN network slice instance. The selected visited control plane function entity may be interoperable to the home PLMN network slice instance.

Step 410: The AMF forwards the PDU session establishment request and an identifier of the home control plane function entity to the visited control plane function entity.

Step 411: The visited control plane function entity sends a PDU session establishment request to the home control plane function entity based on the identifier of the home control plane function entity.

Step 412: Establish a PDU session in a network slice instance corresponding to the PDN connection.

A subsequent process of PDU session establishment is the same as that in an existing protocol. Details are not described herein.

In this embodiment of this application, when the UE has established a PDN connection in the 4G network, the home control plane function entity determines the corresponding network slice information used for transferring the established PDN connection to 5G, and sends the network slice information to the UE via PCO. When the UE is subsequently registered to a 5GC, the UE adds, to a request, visited PLMN network slice information to which the foregoing network slice information is mapped. This helps the 5GC select a corresponding 5G network slice supporting the established PDN connection, and ensures that an IP address of a session remains unchanged.

Actions of the network elements (for example, the terminal and the control plane function entity) in the embodiments of FIG. 3 and FIG. 4 may be performed by the processor 201 of the communications device 200 shown in FIG. 2 by invoking the application program code stored in the memory 203. This embodiment of this application does not impose any limitation thereon.

The foregoing has described the solutions provided in the embodiments of this application mainly from a perspective of interaction between the network elements. It may be understood that, to implement the foregoing functions, devices such as the terminal, the AMF, and the control plane function entity include corresponding hardware structures and/or software modules for performing the functions. A person skilled in the art should be easily aware that, with reference to the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application without departing beyond the scope of this application.

In the embodiments of this application, function modules of devices, such as the terminal and the control plane function entity, may be divided according to the foregoing method examples. For example, the function modules may be divided based on the functions, or two or more functions may be integrated in one processing module. The integrated module may be implemented in a form of hardware, or may be implemented in a form of a software function module. It should be noted that the module division in the embodiments of this application is an example, and is merely logical function division, and there may be other division manners in actual implementation.

Figure 5:
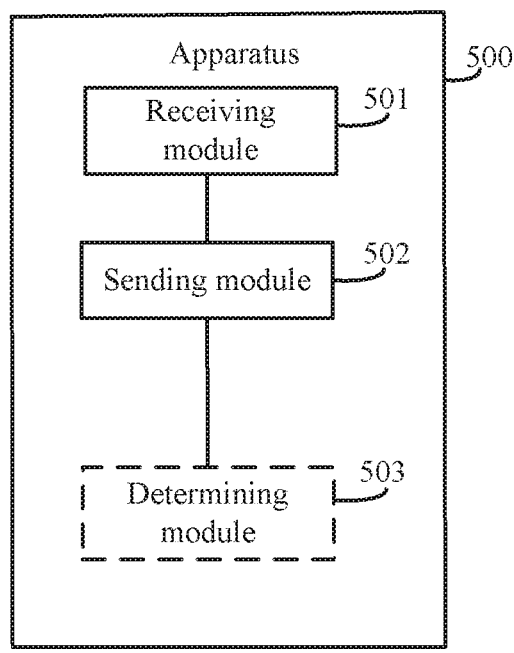
FIG. 5 is a schematic structural diagram of an apparatus according to an embodiment of this application.

For example, FIG. 5 is a schematic structural diagram of an apparatus 500 when the function modules are divided in an integration manner. The apparatus 500 may be the terminal in the foregoing embodiments, or may be a chip in the terminal. This embodiment of this application imposes no specific limitation thereon. As shown in FIG. 5, the apparatus includes a receiving module 501 and a sending module 502. The receiving module 501 is configured to receive, from a control plane function entity, corresponding network slice information used for transferring an established PDN connection to a 5G network, where the corresponding network slice information used for transferring the established PDN connection to the 5G network includes corresponding network-slice S-NSSAI used for transferring the established PDN connection to the 5G network. The sending module 502 is configured to send a PDU session establishment request, where the PDU session establishment request includes corresponding network-slice S-NSSAI used for transferring a first PDN connection to the 5G network and a corresponding data network name DNN used for transferring the first PDN connection to the 5G network, and the first PDN connection is any one of one or more established PDN connections.

Optionally, the corresponding network slice information used for transferring the established PDN connection to the 5G network is carried in a PCO message.

Optionally, the receiving module 501 is further configured to receive indication information from the control plane function entity, where the indication information is used to indicate that the network slice information received from the control plane function entity is home PLMN network slice information.

The terminal further includes a mapping module. The mapping module is configured to map, based on a correspondence between home PLMN network-slice S-NSSAI and visited PLMN network-slice S-NSSAI, corresponding home PLMN network-slice S-NSSAI used for transferring, to 5G, a PDN connection that the terminal wants to transfer, to corresponding visited PLMN network-slice S-NSSAI used for transferring, to 5G, the PDN connection that the terminal wants to transfer.

Optionally, the corresponding network slice information used for transferring the established PDN connection to the 5G network further includes a corresponding network slice instance identifier NSI-ID used for transferring the established PDN connection to the 5G network.

In a possible implementation, the sending module 502 is further configured to send a capability indication to the control plane function entity, where the capability indication is used to indicate that the terminal can be handed over to the 5G network.

The apparatus further includes a determining module 503. The determining module 503 is configured to determine a PDN connection that is in the established PDN connection and that can be transferred to the 5G network. The first PDN connection is any one of the PDN connections that can be transferred to 5G. In a possible implementation, the determining module 503 is configured to send a registration request, where the registration request includes corresponding network slice information used for transferring, to the 5G network, a PDN connection that the terminal wants to transfer, and the PDN connection that the terminal wants to transfer is some or all of the established PDN connection. The determining module 503 is further configured to receive a registration response, where the registration response includes S-NSSAI of a network slice that the terminal is allowed to access, and determine the PDN connection that can be transferred to the 5G network, based on corresponding S-NSSAI used for transferring, to the 5G network, the PDN connection that the terminal wants to transfer and the S-NSSAI of the network slice that the terminal is allowed to access.

Optionally, the PCO message further includes the corresponding DNN used for transferring the first PDN connection to the 5G network, and the PDU session establishment request further includes an APN corresponding to the first PDN connection.

For function descriptions of the corresponding function modules, refer to all related content of the steps included in the foregoing method embodiments. Details are not described herein again.

In this embodiment, the apparatus 500 is presented by dividing the function modules in an integration manner. Herein, the "module" may be an application-specific integrated circuit (ASIC), a circuit, a processor that executes one or more software or firmware programs and a memory, an integrated logic circuit, and/or another device that can provide the foregoing functions. In a simple embodiment, a person skilled in the art may figure out that the apparatus 500 may be in the form shown in FIG. 2.

For example, the processor 201 in FIG. 2 may invoke the computer executable instruction stored in the memory 203, such that the apparatus 500 performs the session establishment methods in the foregoing method embodiments.

In some embodiments, functions and implementation processes of the receiving module 501, the sending module 502, and the determining module 503 in FIG. 5 may be implemented by the processor 201 in FIG. 2 by invoking the computer executable instruction stored in the memory 203.

Optionally, when the apparatus 500 is a chip, the functions and the implementation processes of the receiving module 501, the sending module 502, and the determining module 503 may be implemented by a pin, a circuit, or the like. Optionally, when the apparatus 500 is a chip, the memory 203 may be a storage unit in the chip, for example, a register or a cache. Certainly, when the apparatus 500 is a terminal, the memory 203 may be a storage unit that is in the terminal and that is outside a chip. This embodiment of this application imposes no specific limitation thereon.

The apparatus provided in this embodiment of this application may be configured to perform the foregoing session establishment methods. Therefore, for a technical effect that can be achieved by the apparatus, refer to the foregoing method embodiments. Details are not described herein again.

Figure 6:
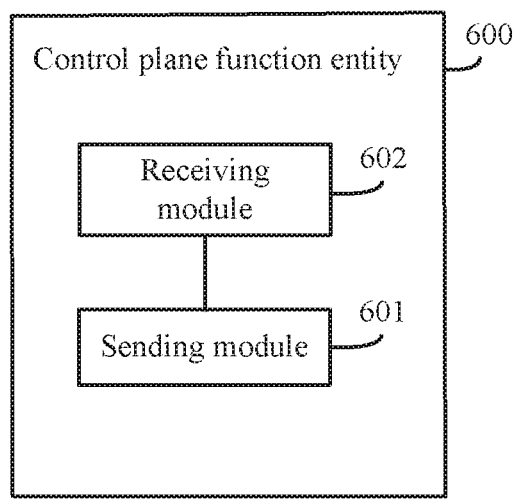
FIG. 6 is a schematic structural diagram of a control plane function entity according to an embodiment of this application.

FIG. 6 is a schematic structural diagram of a control plane function entity 600. The control plane function entity 600 includes a sending module 601 and a receiving module 602. The sending module 601 is configured to send corresponding network slice information used for transferring an established packet data network (PDN) connection to a 5G network, where the corresponding network slice information used for transferring the established PDN connection to the 5G network includes network-slice (single network slice selection assistance information) S-NSSAI corresponding to the established PDN connection. The receiving module 602 is configured to receive a PDU session establishment request, where the PDU session establishment request includes network-slice S-NSSAI corresponding to a first PDN connection and a corresponding DNN used for transferring the first PDN connection to the 5G network, and the first PDN connection is any one of the established PDN connection.

Optionally, the corresponding network slice information used for transferring the established PDN connection to the 5G network is carried in a PCO message, and the PCO message further includes a corresponding DNN used for transferring the established PDN connection to the 5G network.

Optionally, the control plane function entity further includes a determining module. The determining module is configured to determine, based on an APN corresponding to the established PDN connection, the corresponding network slice information used for transferring the established PDN connection to the 5G network.

In a possible implementation, the sending module 502 is further configured to send indication information, where the indication information is used to indicate that the network slice information sent by the control plane function entity is home PLMN network slice information.

If the established PDN is established in a Home routed scenario, the sending module 502 is configured to determine corresponding home PLMN network slice information used for transferring the established PDN connection to 5G, map the corresponding home PLMN network slice information used for transferring the established PDN connection to 5G to visited PLMN network slice information, and send, to the terminal as the corresponding network slice information used for transferring the established PDN connection to 5G, corresponding visited PLMN network slice information used for transferring the established PDN connection to 5G.

Optionally, the corresponding network slice information used for transferring the established PDN connection to the 5G network further includes a corresponding network slice instance identifier (NSI-ID) used for transferring the established PDN connection to the 5G network.

In a possible implementation, the receiving module 602 is further configured to receive a capability indication from the terminal, where the capability indication is used to indicate that the terminal can be handed over to the 5G network.

For function descriptions of the corresponding function modules, refer to all related content of the steps included in the foregoing method embodiments. Details are not described herein again.

The control plane function entity 600 may be implemented on an integrated circuit, a radio frequency integrated circuit, a printed circuit board, or the like. In addition, the control plane function entity 600 may be an independent device, or may be a part of a relatively large device. In this embodiment, the control plane function entity 600 is presented by dividing the function modules in an integration manner. Herein, the "module" may be a specific ASIC, a circuit, a processor that executes one or more software or firmware programs and a memory, an integrated logic circuit, and/or another device that can provide the foregoing functions.

In a simple embodiment, a person skilled in the art may figure out that the control plane function entity 600 may be in the form shown in FIG. 2. For example, the processor 201 in FIG. 2 may invoke the computer executable instruction stored in the memory 203, such that the control plane function entity 600 performs the session establishment methods in the foregoing method embodiments.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, the term "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to features and the embodiments thereof, it is to be understood that various modifications and combinations may be made to this application without departing from the spirit and scope of this application. Correspondingly, the specification and accompanying drawings are merely example descriptions of this application defined by the accompanying claims, and are considered as any of or all modifications, variations, combinations or equivalents that cover the scope of this application. A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A session establishment method, comprising:
receiving, by a terminal from a control plane function entity during establishment of a packet data network (PDN) connection in a fourth generation (4G) network, single network slice selection assistance information (S-NSSAI) corresponding to the PDN connection and a public land mobile operator network (PLMN) ID, wherein the PLMN ID indicates that the S-NSSAI corresponding to the PDN connection received from the control plane function is a home PLMN S-NSSAI;
mapping, by the terminal based on a correspondence between home PLMN S-NSSAI and visited PLMN S-NSSAI, the home PLMN S-NSSAI corresponding to the PDN connection to a visited PLMN S-NSSAI corresponding to the PDN connection; and
sending, by the terminal, session establishment request when transferring the PDN connection to a fifth generation (5G) network, wherein the session establishment request comprises the visited PLAIN S-NSSAI corresponding to the PDN connection.

2. The method according to claim 1, wherein the home PLMN S NSSAI corresponding to the PDN connection is included in a protocol configuration option (PCO).

3. The method according to claim 1, further comprising indicating, by the terminal via a protocol configuration option (PCO), to the control plane function entity that the PDN connection supports being subsequently transferred to the 5G network.

4. The method according to claim 1, further comprising sending, by the terminal, a registration request to a base station, wherein the registration request comprises the visited PLMN S-NSSAI corresponding to the PDN connection.

5. The method according to claim 4, wherein the visited PLMN S-NSSAI corresponding to the PDN connection is carried in a "Requested NS SAT' field of the registration request.

6. The method according to claim 5, further comprising selecting, by the base station, an access and mobility management function according to the visited PLMN S-NSSAI corresponding to the PDN connection.

7. The method according to claim 1, wherein the session establishment request further comprises a corresponding data network name (DNN).

8. The method according to claim 1, wherein the control plane function entity is a PDN gateway control plane function (PGW-C)+session management function (SMF) entity.

9. A session establishment method, comprising:
sending, by a control plane function entity to a terminal during establishment of a packet data network (PDN) connection in a fourth generation (4G) network, single network slice selection assistance information (S-NSSAI) corresponding to the PDN connection and a public land mobile operator network (PLMN) identifier (ID), wherein the PLMN ID indicates that the S-NSSAI corresponding to the PDN connection sent to the terminal is a home PLMN S-NSSAI; and
receiving, by the control plane function entity, a session establishment request when transferring the PDN connection to a fifth generation (5G) network, wherein the session establishment request comprises the S-NSSAI corresponding to the PDN connection.

10. The method according to claim 9, wherein the S-NSSAI corresponding to the PDN connection is included in a protocol configuration option (PCO).

11. The method according to claim 9, further comprising receiving, by the control plane function entity via a protocol configuration option (PCO) message, capability indication from the terminal, wherein the capability indication indicates that the PDN connection supports being subsequently transferred to the 5G network.

12. The method according to claim 9, wherein the session establishment request further comprises a corresponding data network name (DNN).

13. The method according to claim 9, wherein the control plane function entity is a PDN gateway control plane function (PGW-C)+session management function (SMF) entity.

14. An apparatus comprising:
a processor; and
a memory coupled to the processor and having program instructions stored thereon which, when executed by the processor, cause the apparatus to perform operations comprising:
receiving, from a control plane function entity during establishment of a packet data network (PDN) connection in a fourth generation (4G) network, single network slice selection assistance information (S-NSSAI) corresponding to the PDN connection and a public land mobile operator network (PLMN) Identifier (ID), wherein the PLMN ID indicates that the S-NSSAI corresponding to the PDN connection received from the control plane function is a home PLMN S-NSSAI;
mapping, based on a correspondence between home PLMN S-NSSAI and visited PLMN S-NSSAI, the home PLMN S-NSSAI corresponding to the PDN connection to a visited PLMN S-NSSAI corresponding to the PDN connection; and
sending a session establishment request when transferring the PDN connection to a fifth generation (5G) network, wherein the session establishment request comprises the visited PLMN S-NSSAI corresponding to the PDN connection.

15. The apparatus according to claim 14, wherein the home PLMN S-NSSAI corresponding to the PDN connection is included in a protocol configuration option (PCO).

16. The apparatus according to claim 14, wherein the operations further comprise indicating, by the apparatus via a protocol configuration option (PCO) message, to the control plane function entity that the PDN connection supports being subsequently transferred to the 5G network.

17. The apparatus according to claim 14, wherein the session establishment request further comprises a corresponding data network name (DNN).

18. The apparatus according to claim 14, wherein the apparatus comprises a terminal or a chip in the terminal.

19. The method according to claim 14, wherein the control plane function entity is a PDN gateway control plane function (PGW-C)+session management function (SMF) entity.

20. A control plane function entity, comprising:
a processor; and
a memory coupled to the processor and having program instructions stored thereon which, when executed by the processor, cause the apparatus to perform operations comprising:

sending, during establishment of a packet data network (PDN) connection in a fourth generation (4G) network, single network slice selection assistance information (S-NSSAI) corresponding to the PDN connection and a public land mobile operator network (PLMN) identifier (ID) to a terminal, wherein the PLMN ID indicates that the S-NSSAI corresponding to the PDN connection sent to the terminal is a home PLMN S-NSSAI; and receiving a session establishment request when transferring the PDN connection to a fifth generation (5G) network, wherein the session establishment request comprises the S-NSSAI corresponding to the PDN connection.

21. The control plane function entity according to claim 20, wherein the S-NSSAI corresponding to the PDN connection is included in a protocol configuration option (PCO).

22. The control plane function entity according to claim 20, wherein the operations further comprise receiving, by the control plane function entity via a protocol configuration option (PCO) message, capability indication from the terminal, wherein the capability indication indicates that the PDN connection supports being subsequently transferred to the 5G network.

23. The control plane function entity according to claim 20, wherein the session establishment request further comprises a corresponding data network name (DNN).

24. The method according to claim 20, wherein the control plane function entity is a PDN gateway control plane function (PGW-C)+session management function (SMF) entity.

* * * * *